United States Patent [19]

Sensui

[11] Patent Number: 5,206,498
[45] Date of Patent: Apr. 27, 1993

[54] FOCUS DETECTING APPARATUS HAVING VARIABLE POWER CONDENSER LENS

[75] Inventor: Takayuki Sensui, Tokyo, Japan

[73] Assignee: Asahi Kogaku Kogyo Kabushiki Kaisha, Tokyo, Japan

[21] Appl. No.: 893,045

[22] Filed: Jun. 3, 1992

[30] Foreign Application Priority Data

Jun. 7, 1991 [JP] Japan .................. 3-233677

[51] Int. Cl.$^5$ .................. G01J 1/20
[52] U.S. Cl. .................. 250/201.8; 354/407
[58] Field of Search .................. 250/201.8, 204; 359/721; 354/402, 406, 407, 408

[56] References Cited

U.S. PATENT DOCUMENTS

| Re. 31,370 | 9/1983 | Mashimo et al. . | |
|---|---|---|---|
| 4,047,187 | 9/1977 | Mashimo et al. . | |
| 4,090,209 | 5/1978 | Kondo . | |
| 4,183,642 | 1/1980 | Fukuoka . | |
| 4,548,495 | 10/1985 | Suzuki | 250/201.8 |
| 4,552,445 | 11/1985 | Mukai et al. . | |
| 4,560,863 | 12/1985 | Matsumura et al. . | |
| 4,563,576 | 1/1986 | Matsumura et al. . | |
| 4,636,624 | 1/1987 | Ishida et al. . | |
| 4,786,934 | 11/1988 | Kunze et al. . | |
| 4,829,332 | 5/1989 | Shindo . | |
| 4,857,720 | 8/1989 | Karasaki . | |
| 4,859,842 | 8/1989 | Suda et al. . | |
| 4,939,357 | 7/1990 | Shindo . | |
| 4,949,116 | 8/1990 | Karasaki et al. | 354/408 |
| 4,954,701 | 9/1990 | Suzuki et al. . | |
| 4,967,226 | 10/1990 | Kuwata . | |
| 5,017,005 | 5/1991 | Shindo . | |
| 5,075,561 | 12/1981 | Rioux | 250/201.8 |

FOREIGN PATENT DOCUMENTS

| 0430698 | 6/1991 | European Pat. Off. . |
|---|---|---|
| 60-32012 | 2/1985 | Japan . |
| 60-41013 | 3/1985 | Japan . |
| 62-47612 | 3/1987 | Japan . |
| 62-189415 | 8/1987 | Japan . |
| 1-140108 | 6/1989 | Japan . |
| 1-155308 | 6/1989 | Japan . |
| 1-309013 | 12/1989 | Japan . |
| 2-58012 | 2/1990 | Japan . |

Primary Examiner—David C. Nelms
Assistant Examiner—Khaled Shami
Attorney, Agent, or Firm—Sandler Greenblum & Bernstein

[57] ABSTRACT

A focus detecting apparatus in which a pair of bundles of rays transmitted through different portions of an exit pupil of a taking lens are transmitted through a common focus detecting zone on a predetermined focal plane of the taking lens and are then converged onto corresponding line sensors through a condenser lens. Separator lenses reform images separated from an image formed on the predetermined focal plane of the taking lens. The focus detecting zone deviates from the optical axis of the taking lens, and the condenser lens has an asymmetrical power distribution.

11 Claims, 4 Drawing Sheets

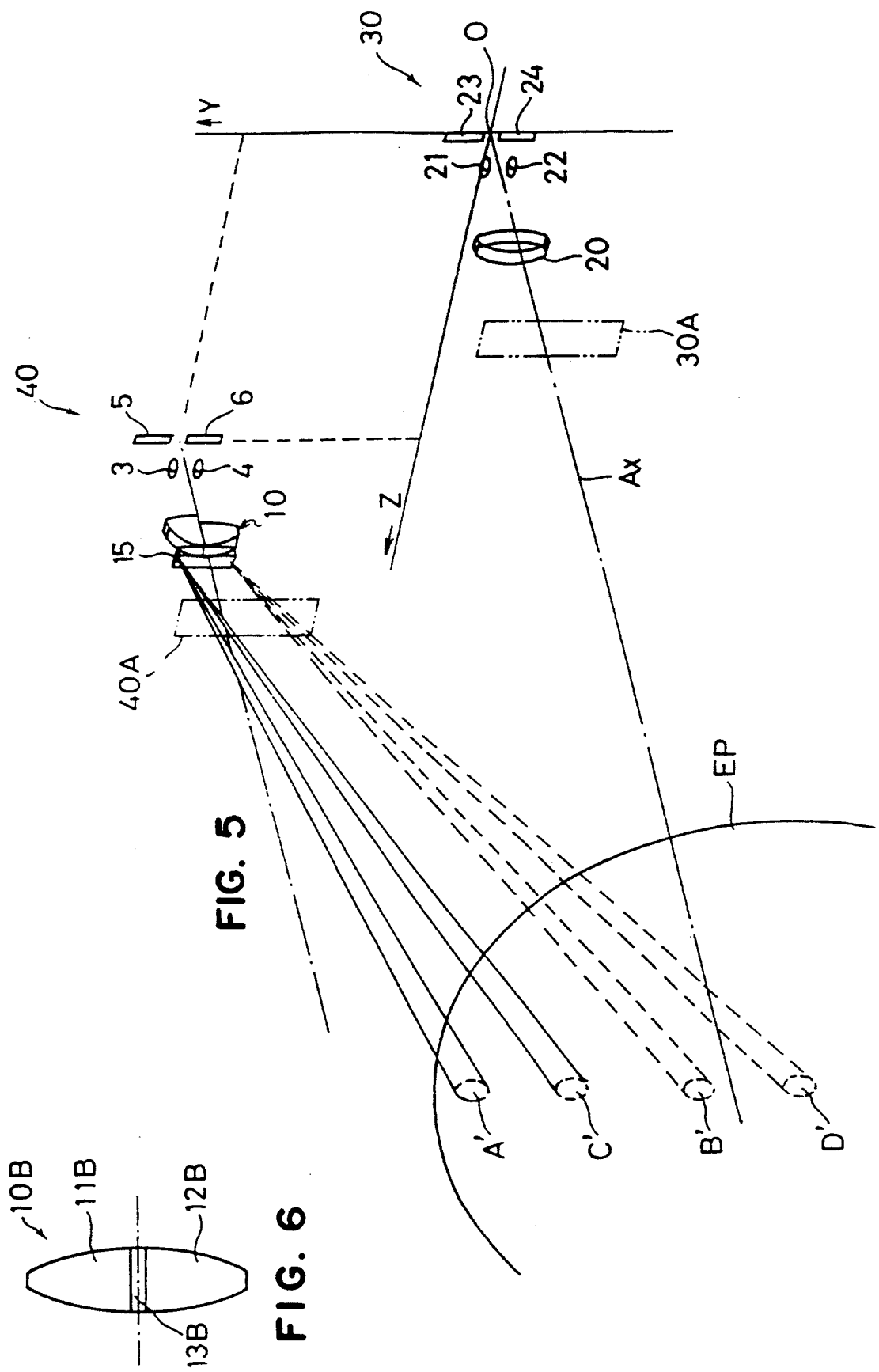

FOCUS DETECTING APPARATUS HAVING VARIABLE POWER CONDENSER LENS

BACKGROUND OF THE INVENTION

1. Field of the Invention

The present invention relates to a focus detecting apparatus for detecting a focus state of a taking lens of a camera or the like, with respect to an object to be photographed.

2. Description of Related Art

In a known focus detecting apparatus of a single lens reflex camera or the like, bundles of rays transmitted through different portions of an exit pupil of a taking lens are converged onto a pair of line sensors by an image reforming lens of a focus detecting optical system, so that the focus state of the taking lens can be detected in accordance with a relationship between outputs of the line sensors. The principle of the focus detection by the focus detecting apparatus is disclosed, for example, in U.S. Pat. No. 4,636,624.

A focus detecting apparatus having an off-axis detecting area (i.e., deviated from an optical axis) for detecting the focus state of a taking lens with respect to an object located at a position other than the center of an image plane is a known apparatus.

However, if there is a large deviation of the off-axis detecting area from the optical axis, vignetting of the focus detecting optical system pupil will occur. For example, vignetting will occur when the position or size of the exit pupil of the taking lens changes as a result of a lens change (i.e., when using an interchangeable lens) or during a zooming operation. In such cases, the area of the focus detecting optical system pupil, through which the bundle of rays is transmitted, is reduced. As a result, the types of interchangeable lenses that can be used in such an automatic focus detecting system are limited.

In particular, if the off-axis detecting areas are aligned in a radial direction of the taking lens, the bundle of rays corresponding to an upper portion of an image to be reformed may not reach the line sensors (i.e. in the case where an image height extends far from the optical axis).

FIG. 7 shows a known focus detecting apparatus having a focus detecting zone that is deviated from an optical axis Ax of a taking lens (not shown). A condenser lens 1 receives a bundle of rays which forms an image on a predetermined focal plane 2 (i.e. a plane which is equivalent to the film plane) from an exit pupil EP of the taking lens. Separator lenses 3 and 4 reform separate images of the bundles of rays transmitted through different portions of the exit pupil EP of the taking lens onto line sensors 5 and 6.

A known optical arrangement, shown in FIG. 7, has a taking lens with an exit pupil EP, which has been scaled down in size for illustrative purposes. In this optical arrangement, the condenser lens 1 has a symmetrical power distribution with respect to the optical axis 1x thereof. Accordingly, the bundles of rays defining the upper portions of the images to be formed on the line sensors 5 and 6 correspond to areas A and B outside the exit pupil EP, which results in vignetting (an eclipse) of an image due to the lack of rays corresponding to the upper portions of the images. In other words, an image which has a high image height can not reach the line sensors 5 and 6.

SUMMARY OF THE INVENTION

A primary object of the present invention is to eliminate the drawback of the prior art, described above, by providing a focus detecting apparatus having an off-axis focus detecting zone, in which the focus state of the taking lens can be precisely detected without an occurrence of vignetting of an image on an image receiving means, even if the image height is high.

To achieve the object mentioned above, according to the present invention, there is provided a focus detecting apparatus in which a pair of bundles of rays, transmitted through different portions of an exit pupil of a taking lens, are transmitted through a common focus detecting zone on a predetermined focal plane of the taking lens, and are then converged onto corresponding line sensors through a condenser lens and separator lenses to reform separate images of an image formed on the predetermined focal plane of the taking lens. The focus detecting zone is deviated from an optical axis of the taking lens, and the condenser lens has an asymmetrical power distribution with respect to an optical axis of the condenser lens.

Preferably, the asymmetrical power distribution of the condenser lens is such that the bundles of rays are converged on corresponding line sensors regardless of the image height on the predetermined focal plane of the taking lens.

In a preferred embodiment, the condenser lens includes a high power portion corresponding to an upper portion of the image on the predetermined focal plane of the taking lens, and a low power portion corresponding to a lower portion of the image on the predetermined focal plane.

The high power portion and the low power portion of the condenser lens can be realized by providing a variation in shape, or a variation in material (i.e., providing materials having different refractive indexes.)

According to another aspect of the present invention, there is provided a focus detecting apparatus comprising an off-axis common focus detecting zone that is provided on a predetermined focal plane of a taking lens, in which a condenser lens converges a pair of bundles of rays that are transmitted through different portions of an exit pupil of the taking lens and the common focus detecting zone, and separator lenses which separate the bundles of rays transmitted through the condenser lens, and form separate images on a pair of line sensors. The condenser lens of the focus detecting apparatus have an asymmetrical power distribution with respect to an optical axis thereof, so that the bundles of rays are converged on corresponding line sensors regardless of the size and position of the exit pupil of the taking lens, or the image height of the image on the predetermined focal plane of the taking lens.

According to still another aspect of the present invention, a focus detecting apparatus Comprises a condenser lens, separator lenses, an image reforming optical system for reforming separate images of an object image formed on a predetermined focal plane, and two image receiving means for detecting a relative deviation of the separate images reformed by the image reforming optical system. The condenser lens has a high power portion which receives a bundle of rays corresponding to a higher portion of the object image on the predetermined focal plane and a low power portion which receives a bundle of rays corresponding to a lower portion of the object image on the predetermined focal plane.

The present disclosure relates to subject matter contained in Japanese Patent Application No. HEI3-233677 (filed on Jun. 7, 1992), which is expressly incorporated herein by reference in its entirety.

BRIEF DESCRIPTION OF THE DRAWINGS

The present invention will be described below in detail with reference to the accompanying drawings, in which:

FIG. 5 is an explanatory view of an optical system of a focus detecting apparatus according to another aspect of the present invention;

FIG. 6 shows an additional example of a condenser lens according to the present invention; and, FIG. 7 is an explanatory view of an optical system of a known focus detecting apparatus.

DESCRIPTION OF THE PREFERRED EMBODIMENTS

Figure 1:
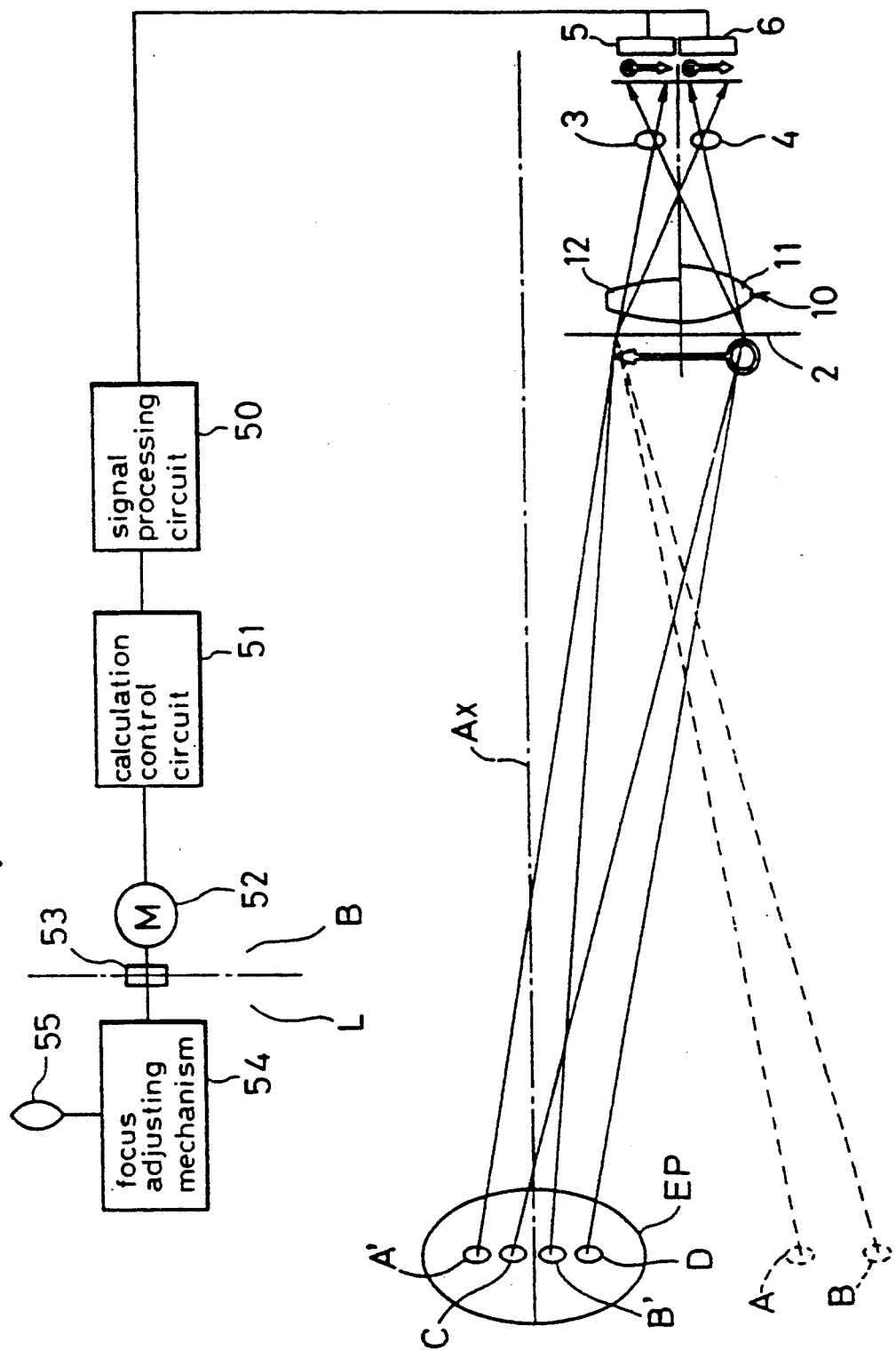
FIG. 1 is an explanatory view of an optical system of a focus detecting apparatus according to an aspect of the present invention.

FIGS. 1 through 4 show a first embodiment of the present invention.

A focus detecting apparatus according to a first embodiment of the present invention detects that is focus state of a taking lens with respect to an object that is located in a detecting zone that is deviated from an optical axis Ax of the taking lens (i.e., in an off-axis focus detecting zone) on a predetermined focal plane 2. The focus detecting apparatus includes a condenser lens 10 and separator lenses 3 and 4, which together constitute an image reforming optical system, and a pair of line sensors 5 and 6 which constitute an image receiving means. In the illustrated embodiment, the line sensors 5 and 6 are aligned in a radial direction of the taking lens in a plane that is perpendicular to the optical axis Ax.

The condenser lens 10 has a low power portion 12 which receives a bundle of rays from the exit pupil EP of the taking lens, and forms a lower portion of an image on the focal plane 2. The condenser lens 10 also has a high power portion 11 which receives a bundle of rays from the exit pupil EP of the taking lens and forms an upper portion of the image.

The portions of the separate images on the line sensors 5 and 6 that correspond to the lower portion of the image on the focal plane 2 are formed by the bundle of rays fetched by the low power portion 12 of the condenser lens 10 from areas A' and B' within the exit pupil EP of the taking lens. Similarly, the portions of the separate images on the line sensors 5 and 6 that correspond to the upper portion of the image on the focal plane 2 are formed by the bundle of rays fetched by the high power portion 11 of the condenser lens 10 from areas C and D within the exit pupil EP of the taking lens.

Figure 2:
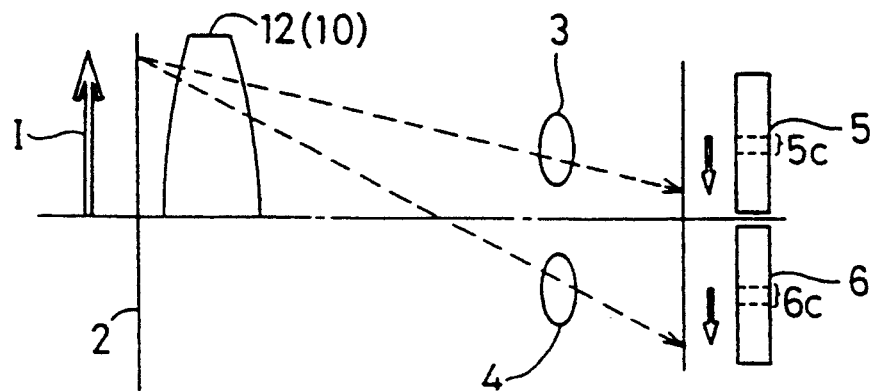
FIG. 2 is a conceptual view of a condenser lens shown in FIG. 1 that illustrate an optical function Of a low power portion thereof.
Figure 3:
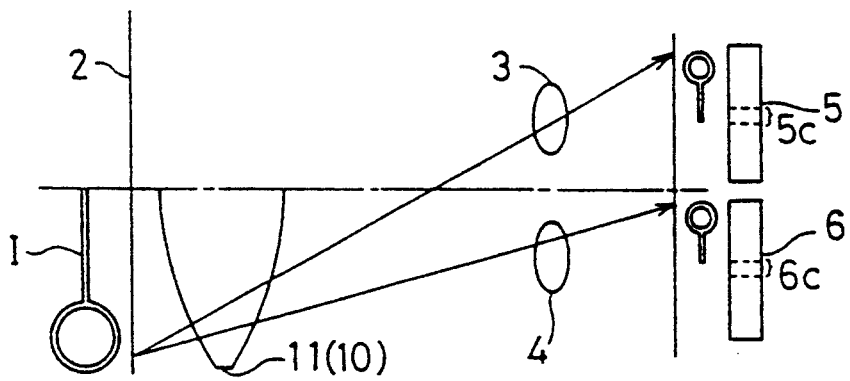
FIG. 3 is a conceptual view of the condenser lens shown in FIG. 1 that illustrate an optical function of a high power portion thereof.

FIGS. 2 and 3 show a refraction of light by the low power portion 12 and the high power portion 11, of the condenser lens 10, respectively. The bundle of rays corresponding to the lower portion of the object image I is slightly refracted by the low power portion 12, and is then imaged onto the line sensors 5 and 6 through the separator lenses 3 and 4. The bundle of rays corresponding to the upper portion of the object image I is refracted to a greater degree than the lower portion of the object image I by the high power portion 11, and is then imaged onto the line sensors 5 and 6 through the separator lenses 3 and 4.

As can be understood from the above discussion, the asymmetric power distribution of the condenser lens 10 with respect to its optical axis ensures a formation of perfect separate images on the line sensors 5 and 6 without an occurrence of vignetting of the images, unlike the prior art.

Figure 7:
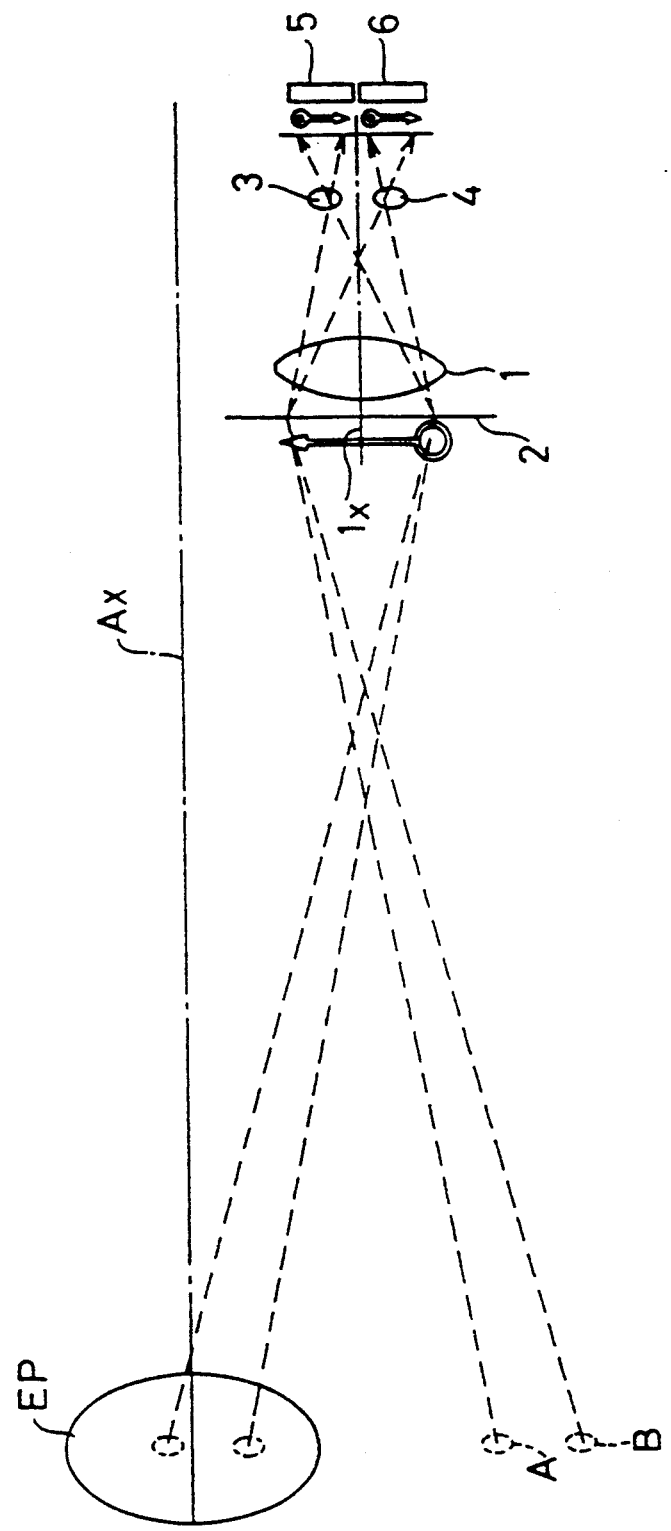

If the condenser lens 10 had a uniformly distributed power identical to the power of the high power portion 11, it would be necessary to fetch the bundles of rays from areas A and B (shown by phantom lines in FIG. 1) outside the exit pupil EP to form the lower portions of the images on the line sensors 5 and 6. In other words, it would be impossible to fetch the bundles of rays from the outside areas A and B without increasing the size of the exit pupil EP. However, this is not practical. Thus, the images on the line sensors 5 and 6 are partly eclipsed, as discussed above with reference to FIG. 7.

The outputs of the line sensors 5 and 6 are inputted to a signal processing circuit 50 and a calculation controlling circuit 51 which calculates a positional relationship of the separate images to thereby detect an amount of defocus of the object, based on the outputs of the line sensors 5 and 6. The calculation controlling circuit 51 drives a control motor 52 that is provided in a camera body B, based on the calculation results, and actuates a focus adjusting mechanism 54 of a taking lens L, through a drive coupling 53, to thereby move a focus adjusting lens 5 in the optical axis direction.

The condenser lens 10, having an asymmetrical power distribution with respect to the optical axis, can be realized by adhering two lenses that have different shapes or a single plastic lens having an asymmetrical shape.

Figure 4:
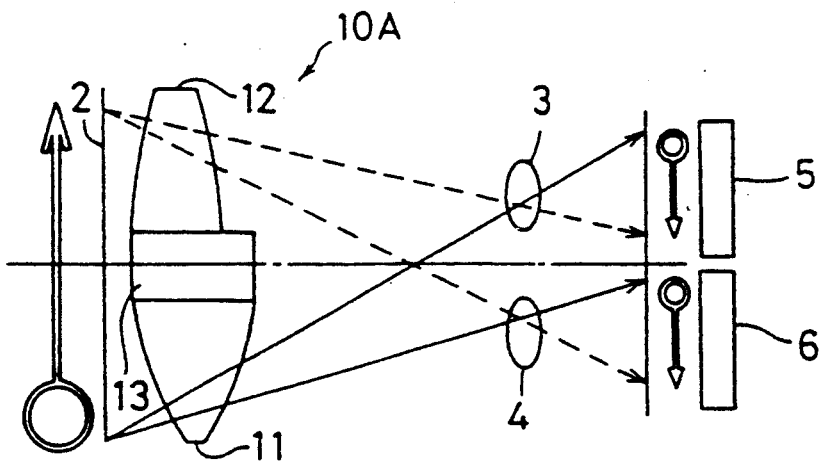
FIG. 4 is a modified arrangement of FIGS. 2 and 3, in which a light intercepting member is provided between the high and low power portions of the condenser lens.

FIG. 4 shows an preferred example of a condenser lens 10A which has a high power portion 11, a low power portion 12, and a light intercepting member 13 therebetween. The light intercepting member 13 prevents an optical discontinuity at the boundary of the high power portion 11 and the low power portion 12 and also prevents harmful light from being made incident on the line sensors 5 and 6.

Alternatively, in place of the provision of the light intercepting member 13, it is also possible to realize a control system in which electrical signals from intermediate portions 5c and 6c (FIGS. 2 and 3) of the line sensors 5 and 6, on which the bundles of rays are made incident from the boundary portions of the high power portions 11 and the low power portions 12 of the condenser lens 10, are not used for the calculation in the signal processing circuit 50 or the calculation controlling circuit 51. Furthermore, it is also possible to intercept light which would otherwise be made incident on the intermediate portions 5c and 6c of the line sensors 5 and 6.

FIG. 5 shows another embodiment of a focus detecting apparatus of the present invention. In this embodiment, there is provided an on-axis focus detecting device 30 having an on-axis focus detecting zone 30A on the optical axis Ax of the taking lens, and an off-axis focus detecting device 40 having an off-axis focus detecting zone 40A that is deviated from the optical axis Ax.

The on-axis focus detecting device 30 includes a condenser lens 20 having a symmetrical power distribution with respect to the optical axis, a pair of separator lenses 21 and 22, and a pair of line sensors 23 and 24. The on-axis focus detecting device 30 detects the focus state of the taking lens with respect to the object image within the focus detecting zone 30A. The focus detecting zone 30A is provided on the predetermined focal plane.

The off-axis focus detecting device 40 includes a condenser lens 10 similar to the condenser lens 10 having an asymmetrical power distribution, as shown in FIG. 1, a pair of separator lenses 3 and 4, a pair of line sensors 5 and 6, and a prism 15 that is located closer to the exit pupil EP than the condenser lens 10 in order to detect the focus state of the taking lens with respect to the object image within the focus detecting zone 40A provided on the predetermined focal plane.

The line sensors 5 and 6 are aligned in a direction parallel with a direction Y in a plane perpendicular to the optical axis Ax of the taking lens. The centers of the line sensors 5 and 6 are deviated from an intersection point O of axes Y and Z in directions Y and Z. Consequently, the bundles of rays are deflected by the prism 15 in the Z direction and are then deflected by the 10 condenser lens 10 in the Y direction depending on the image height, so that the bundles of rays from the exit pupil EP are made incident on the line sensors 5 and 6 to form separate images of the off-axis object.

The function of the asymmetrical condenser lens 10 in FIG. 5 is similar to that of the asymmetrical condenser lens 10 in FIG. 1.

In the case where a plurality of focus detecting devices are provided, as shown in FIG. 5, an automatic focusing device of a camera is generally adapted to select one of them in accordance with either a photographer's intention or the determination of a judging means that is provided in the camera, so that the taking lens can be driven in accordance with an output of a selected focus detecting device.

Although the asymmetrical power distribution of the condenser lens is realized by a variation in the shape of the lens in the illustrated embodiment, it is possible to provide an asymmetrical power distribution that is realized by making the lens out of different optical materials (i.e., materials having different indexes of refraction). FIG. 6 shows an example of a condenser lens 10B which is made of two different materials having different refractive indexes. Namely, the condenser lens 10B includes a high power portion 11B made of a material having a high refractive index and a low power portion 12B made of a material having a low refractive index. The high power portion 11B and the low power portion 12B are adhered to each other by an adhesive layer or light intercepting layer 13B.

Although two separate line sensors 5 and 6 are provided in the illustrated embodiments, it is possible to provide a single line sensor having two separate sensor zones.

As can be seen from the above discussion, according to the present invention, since the condenser lens has an asymmetrical power distribution, the bundles of rays emitted from the exit pupil of the taking lens can be received in the off-axis focus detecting zone that is shifted from the optical axis of the taking lens, thereby preventing vignetting of the images on the image receiving elements. A precise detection of the focus state of the taking lens, with respect to the object, can thus be effected.

I claim:

1. A focus detecting apparatus in which a pair of bundles of rays, transmitted through different portions of an exit pupil of a taking lens, are transmitted through a common focus detecting zone on a predetermined focal plane of said taking lens and are then converged onto corresponding line sensors through a condenser lens and separator lenses to reform separate images of an image formed on said predetermined focal plane of said taking lens, wherein said focus detecting zone deviates from an optical axis of said taking lens, and, said condenser lens has an asymmetrical power distribution with respect to an optical axis of said exit pupil of said taking lens.

2. The focus detecting apparatus of claim 1, wherein said asymmetrical power distribution of said condenser lens is such that said bundles of rays are converged onto corresponding line sensors regardless of an image height on said predetermined focal plane of said taking lens.

3. The focus detecting apparatus of claim 1, wherein said condenser lens includes a high power portion corresponding to an upper portion of said image on said predetermined focal plane of said taking lens and a low power portion corresponding to a lower portion of said image on said predetermined focal plane.

4. The focus detecting apparatus of claim 3, wherein said condenser lens has separately shaped portions that correspond to said high power portion and said low power portion.

5. The focus detecting apparatus of claim 3, wherein said high power portion and said low power portion of said condenser lens are made of materials having different refractive indexes to realize said high power portion and said low power portion.

6. The focus detecting apparatus of claim 3, wherein said high power portion and said low power portion of said condenser lens are made of materials having different refractive indexes and are separately shaped to realize said high power portion and said low power portion.

7. The focus detecting apparatus of claim 3, wherein said condenser lens is provided with a light intercepting member between said high power portion and said low power portion.

8. The focus detecting apparatus of claim 3, further comprising means for preventing light transmitted through a boundary portion of said high power portion and said low power portion of said condenser lens from being made incident upon corresponding portions of said line sensors.

9. The focus detecting apparatus of claim 3, further comprising means for preventing an output of portions of said line sensors on which light transmitted through a boundary portion of said high power portion and said low power portion of said condenser lens is made incident.

10. A focus detecting apparatus, comprising:

an off-axis common focus detecting zone that is provided on a predetermined focal plane of a taking lens;

a condenser lens that converges a pair of bundles of rays transmitted through different portions of an exit pupil of said taking lens and said off-axis common focus detecting zone; and, separator lenses that separate said bundles of rays transmitted through said condenser lens, and form separate images on a pair of line sensors, wherein said condenser lens has an asymmetrical power distribution with respect to an optical axis thereof, so that said bundles of rays are converged on corresponding line sensors regardless of a size and position of said exit pupil of said taking lens, or an image height of said image on said predetermined focal plane of said taking lens.

11. A focus detecting apparatus, comprising a condenser lens, separator lenses, an image reforming optical system for reforming separated images of an object image formed on a predetermined focal plane which is equivalent to a film plane, and two image receiving means for detecting a relative deviation of said separated images reformed by said image reforming optical system, wherein said condenser lens has a high power portion that receives a bundle of rays corresponding to an upper portion of said object image on said predetermined focal plane and a lower power portion that receives a bundle of rays corresponding to a lower portion of said object image on said predetermined focal plane.

* * * * *

UNITED STATES PATENT AND TRADEMARK OFFICE
CERTIFICATE OF CORRECTION

PATENT NO. : 5,206,498
DATED : April 27, 1993
INVENTOR(S) : T. SENSUI

It is certified that error appears in the above-indentified patent and that said Letters Patent is hereby corrected as shown below:

At column 8, line 11 (claim 11, line 11), change "lower" to ---low---.

Signed and Sealed this

Nineteenth Day of April, 1994

Attest:

BRUCE LEHMAN

Attesting Officer     Commissioner of Patents and Trademarks